United States Patent [19]
Biros et al.

[11] Patent Number: 5,276,252
[45] Date of Patent: Jan. 4, 1994

[54] METHOD AND INSTALLATION FOR THE STORAGE OF SOLIDIFIED WASTES

[75] Inventors: Jean-Louis Biros, Acheres; Bertrand Gontard, Herblay; Philippe Pichat, Paris, all of France

[73] Assignee: SARP Industries, Limay, France

[21] Appl. No.: 2,840

[22] Filed: Jan. 15, 1993

[30] Foreign Application Priority Data

Jan. 17, 1992 [FR] France .............................. 92 00458

[51] Int. Cl.⁵ .............................................. B09B 5/00
[52] U.S. Cl. .................................... 588/249; 405/128; 588/259
[58] Field of Search ................. 588/249, 259; 405/128, 405/129, 263, 266

[56] References Cited

U.S. PATENT DOCUMENTS

| | | | |
|---|---|---|---|
| 4,618,284 | 10/1986 | Marks | 405/129 X |
| 4,909,667 | 3/1990 | DeMello | 405/128 |
| 4,936,706 | 6/1990 | Luftenegger et al. | 405/128 |

FOREIGN PATENT DOCUMENTS

| | | |
|---|---|---|
| 0008078 | 8/1989 | European Pat. Off. |
| 3641780 | 9/1987 | Fed. Rep. of Germany |
| 3839934 | 5/1990 | Fed. Rep. of Germany |
| 3840604 | 6/1990 | Fed. Rep. of Germany |
| 4003007 | 8/1991 | Fed. Rep. of Germany |
| 2568608 | 2/1986 | France |

*Primary Examiner*—David H. Corbin
*Attorney, Agent, or Firm*—Browdy and Neimark

[57] ABSTRACT

The disclosure relates to the field of the storage of toxic wastes, in solidified form, without the creation of any pollution, on appropriate artificial sites. Briefly, a concrete raft is cast on a ground stabilized in depth, said concrete raft being constituted by slabs having joints between them and being arranged in a diamond moulding. This raft can support a tight-sealing material. Wastes are then piled up on the raft in maintaining the shape of a tumulus-like mound, the positioning being done under the protection of a movable cover comprising a travelling crane provided with rolls of plastic film.

20 Claims, 1 Drawing Sheet

METHOD AND INSTALLATION FOR THE STORAGE OF SOLIDIFIED WASTES

BACKGROUND OF THE INVENTION

1. Field of the Invention

The present invention relates to the field of the storage of wastes and to the depositing of these wastes in appropriate artificial sites.

It relates to a new method of storage where the risks of pollution by toxic wastes are minimized to the utmost, as well as to a corresponding installation.

The many difficult problems raised by waste dumps or tips into which various, often harmful, wastes are poured are known. Environmentalists often associate the very term "waste dump" or "tip" itself with the pollution of ground, surface water, underground water and surrounding air.

2. Description of the Prior Art

At present the different wastes, especially industrial wastes, barring nuclear wastes which constitute a specific case, are placed in large cavities of variable depths. A system such as this entails numerous drawbacks. These drawbacks include: the impossibility of making a visual check on the wastes and on their progress; the great difficulty and the high cost of taking samples for the periodic analyses that are normally necessary; the knotty problems raised by the need for quantitative and qualitative follow-up measures; the signs of the changes undergone by the stored wastes, such as leaching product, the presence of malodorous and even explosive gases; the need, when the discharge produces intolerable pollution, to remove the stored wastes and process them, which leads to difficult and costly operations; finally the understandable climate of suspicion that grows among the surrounding populace.

There is therefore an imperative and pressing need for storage systems and facilities wherein harmful wastes can be piled up without polluting the ground, water or air.

The invention makes it possible to meet these requirements and is also geared to other aims, notably: the visual checking of wastes, the checking of the changes undergone by these wastes as well as the periodic analysis of the leaching product of the wastes during rainfall, the possibility of conveying wastes during periods of rainfall or snowfall without any risk of causing pollution; finally high security of storage of wastes with respect to the mechanical and the physical aspects of the ground used as a substrate for wastes as well as the stability, in time, of the means used for the protection of the wastes.

SUMMARY OF THE INVENTION

To achieve these aims and others that shall appear in the course of the present description, the method of the invention consists, in its most general definition in: a) stabilizing the ground on a height or depth of at least 80 cm with cement, blast-furnace slag or an equivalent material by preparing a gradient of some degrees, and by then casting a high-performance concrete raft foundation in the form of large-sized slabs with a thickness of at least one meter, a concrete basin opening out into a retention tank being provided on the periphery of the raft; b) bringing the wastes to the raft as and when they arrive, storing them in the form of a tumulus-shaped mound; c) providing for a cover, on top of the wastes, that is movable and adjustable according to the size of the stored waste, comprising a travelling crane, the rolling means of which move in said basin, said crane being provided with unwinding rolls of plastic film serving as the cover.

It will be understood already that, under these conditions, through the stabilization of the ground and through the foundation or raft, it is possible to obtain the desired functions of mechanical resistance and tight sealing with a view to making the installation long-lived; the quality of the water collected can be checked by means of drains around the raft and the retention basin; the wastes stored in mound form are easily visible and can be monitored "by sight"; the adjustable and advantageously transparent cover of the stock of wastes makes for easier monitoring and also ensures the long-lasting nature of the entire facility.

The stabilization of the pre-existing ground can be done by any known means. However, it has proved to be particularly advantageous to use, as binders, either slag cement (AFNOR standard) or a Portland type cement with a low C3A content. Preferably, reinforcing agents such as, for example, silica superfines are added to the binder, generally at a rate of 5% to 10% of the weight of the cement.

To make a high-performance concrete foundation or raft, the water/cement ratio used is advantageously smaller than 0.35 and a superliquefier is used during the mixing of the concrete. Furthermore, the concrete is preferably reinforced, either by means of a metal lattice or rather by soldered sheets made of plastic and/or fibers, for example polypropylene, 2 to 5 cm thick, with a dosage of 1 kg/m3 of concrete. The concrete is cast in slabs, about 15 meters by 15 meters with a thickness of one meter, for example on a total length of 90 meters. The joints between the slabs cast in a diamond moulding are preferably constituted by a high-performance polymer composition, for example chlorotrifluoroethylene or tetrafluoroethylene and ethylene copolymer (CTF2E). Instead of concrete, it is also possible to use wastes solidified and cast on the spot, according to methods known per se.

According to one variant, a water-tight and resistant material may be placed on the raft made of concrete or equivalent material, before the wastes are brought in. This material may be constituted by a sheet of copolymer CTF2E. This product gives excellent resistance to atmospheric factors and high tear strength. It is furthermore anti-adhesive, hence self-cleaning and hardly inflammable, and it is capable of being soldered, thermoformed and, if necessary, metallized. Its temperature of use varies from $-50°$ C. to $+150°$ C. Advantageously, the CTF2E film is kept separate from the concrete by a known type of geotextile. According to one variant, the CTF2E film may be replaced by a multilayer sheet having the property of expanding and swelling in the presence of a small quantity of water so as to form a gel that seals the leak, if any, by preventing movements of water behind the sheet or membrane. Thus, the membrane may advantageously be constituted by a complex constituted by high density polyethylene, montmorillonite and butyl rubber.

The wastes to be stored are deposited successively on the imperviously sealed concrete raft in maintaining the shape of a tumulus-like mound, i.e. the shape of a regular trapezoid, for example with a base of 12 meters and a height of 5 meters. The positioning is done in a sliding formwork under the protection of a movable cover that has the same length as the stabilized ground and is supported by a travelling crane mounted on tires that moves about in the trough on the periphery of the raft. The crane is provided, on its upper face and on its side faces, with rolls of plastic film, for example CTF2E film, which unwinds as and when it is needed to cover the tumulus-shaped mound.

BRIEF DESCRIPTION OF THE DRAWINGS

The invention will be understood more clearly from the subsequent description of a non-restrictive example of an installation for the storage of wastes in accordance with the above-mentioned method, made with reference to the appended drawings, which represent schematic views as follows.

DETAILED DESCRIPTION OF THE INVENTION

Figure 1:
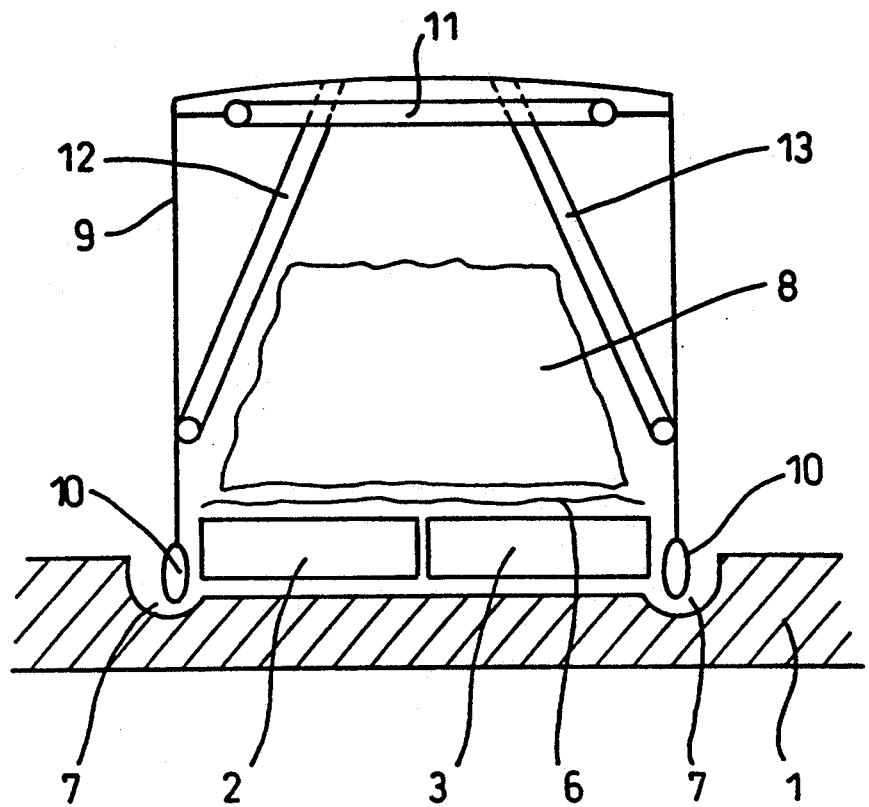
FIG. 1 shows a sectional view of an embodiment of the invention for the storage of solid or paste-like wastes.
Figure 2:
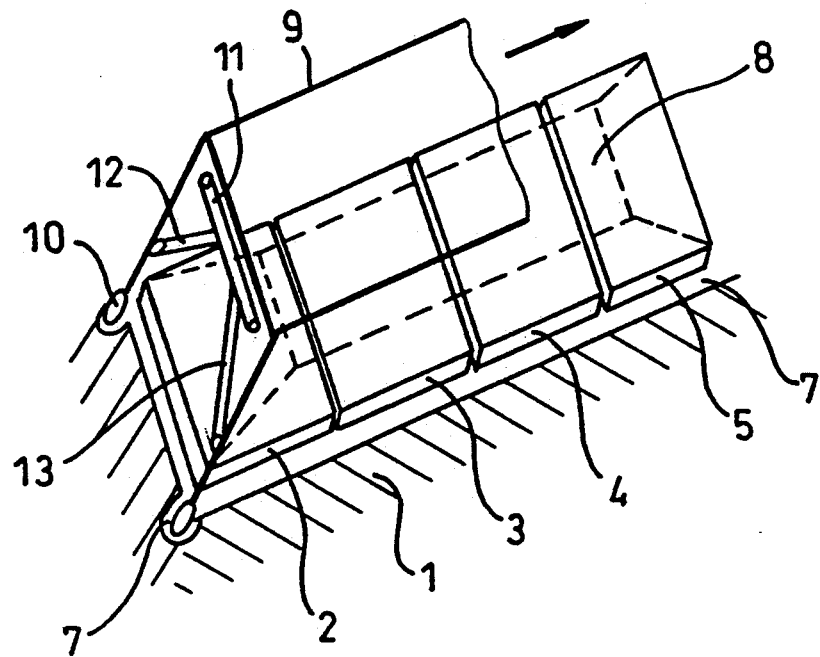
FIG. 2 shows a view in perspective of said embodiment.

To make a storage of solidified wastes in accordance with the invention, a geographical site is chosen appropriately, and then the ground 1 is stabilized on a height of about 80 cm. to 1 m, a gradient of some degrees being made in order to enable the natural removal of rainwater. The stabilization can be done by any known means, for example by means of blast furnace slag, Portland cement or lime, by using a rotator and then by the application of a vibration and compaction treatment. A waste having properties of a hydraulic binder may also be used for the stabilization.

On the stabilized ground, series of high-performance concrete slabs are cast in several steps. These concrete slabs, herein referenced 2, 3, 4, 5, form aligned diamond moulding. These slabs may have, for example, lengths and widths of 15 meters, with a depth of at least one meter, and the total length may be 90 meters or more. To obtain high-performance concrete, a water/cement ratio of less than 0.35 is applied, a liquefier being used during the mixing. The binder may advantageously be constituted by a Portland cement with a low C3A content or a slag cement, with the addition of fine particles of silica, for example in a proportion of about 5 to 10% of the weight of the cement. Advantageously, the concrete may be reinforced by one or more metal lattices and/or by sheets of plastic material, made of polypropylene for example, with a thickness of 2 cm to 5 cm in a proportion of 1 kg/m3 of concrete. The joints between the slabs will be made of a hydrophobic material such as, for example, chlorotrifluoroethylene or CTF2E type fluorinated copolymer.

Once the concrete raft has been completed, it is advantageously covered with a material 6 that is watertight and proof against corrosive liquids (whether bases or acids). To to this, a geotextile can be positioned and then this may be followed by the application of a double sheet of polymer, advantageously CTF2E, for example with a length of 180 meters for a raft 90 meters long. This gives insulation with excellent resistance to atmospheric influences and excellent tear strength. The properties of non-adhesion, self-cleaning and non-inflammability are remarkable. According to one variant, to prevent difficulties, if any, related to the perfect installation of a sheet such as this, said sheet can be replaced by multilayer film of a plastic complex formed by high-density polyethylene, montmorillonite and butyl rubber. A product such as this expands in the event of a leakage of water and leads to the formation of gels by which leakages of fluid can be sealed off.

On the stabilized ground and at the external periphery of the set of concrete diamond moulding slabs, provision has been made for drains in the form of a concrete trough 7 having a depth of at least 5 cm. and a width, for example, of 0.7 to 1 meter. The rainwater is removed by this set of troughs and then collected in a retention basin (not shown in the figures) where instruments of analysis can be used to measure and record a variety of parameters such as PH, heavy-metal content, etc. Measuring tools are thus available to ascertain that the liquids collected can truly be identified with rainwater.

The wastes to be stored are placed on the concrete raft, provided with its tight-sealing cover, in the form of a tumulus 8. In practice, this positioning is done in a sliding formwork so that the wastes gradually constitute a regular trapezoid, for example with a base of 12 meters and a height of 5 meters. This bringing of wastes 8 is done under the protection of a travelling crane constituted by a frame 9 that is mounted on wheels and tires 10 and move about in the ditch or trough 7 according to the state of progress of the leading edge of the tumulus. In its upper part, the frame 9 is provided with a roll 11 of plastic film and, on its side parts, it is provided with two other rolls of plastic 12 and 13 inclined by about 45°. It also has soldering equipment (not shown) so that, as and when the tumulus of wastes is constituted, this tumulus can be covered with three sheets of plastic material in its upper part, that are soldered between itself and the horizontal sheet 11. In practice, it is also possible to use the above-mentioned CTF2E type fluorinated copolymer as a plastic material.

Thus, through the above-mentioned assembly, the tumulus is enclosed in an impermeable enclosure. Furthermore, a sheet of plastic material of the same composition as that of the rolls 11, 12, 13 (made of CTF2E for example) is permanently exposed to atmospheric influences on the site and tests are made on it at regular intervals so that, as soon as a slight decline in its properties is observed, the films 11, 12, 13 can be changed. The CTF2E films may be replaced by other equivalent materials such as, for example, a GORETEX (registered mark) type semi-permeable canvas when it is desired to further reduce the water content of the stored wastes. Finally, the same equipment as the one described here above may naturally be used to cover one or more tumulus-shaped mounds.

It will be thus be understood that an installation according to the invention can be used to store wastes without pollution of the ground, water or air. The dumping of the wastes can be done in rain or snow, automatically by means of the movable equipment.

The "visual" inspection of the wastes and of their development is easy, and the storage is done with great security. The system set up can serve as a retention tank.

Furthermore, it is possible to collect all the rain water at a given point and check its composition.

The method and installation according to the invention enables the storage of numerous types of dangerous wastes, such as for example filter-press sludge or, again, all toxic wastes that have undergone solidification treatment according to known techniques such as those of the ECOFIX and ASHROCK (registered marks) processes.

What is claimed is:

1. A method for the pollution-free storage, with the possibility of permanent control and inspection, of solidified wastes liable to contain harmful elements wherein, on an appropriate site: a) the ground is stabilized on a height of at least 80 cm with cement, blast-furnace slag or an equivalent material, by preparing a gradient of some degrees and by then casting a high-performance concrete raft foundation in the form of large-sized slabs with a thickness of at least one meter, the periphery of the raft being surrounded by a concrete basin that opens out into a retention tank; b) the wastes are deposited on the raft in the form of a tumulus-shaped mound; c) the wastes are positioned under the protection of a movable cover comprising a travelling crane running on tires which move about in said basin, said travelling crane being provided with unwinding rolls of plastic film as the cover.

2. A method according to claim wherein the stabilization of the ground is done by a Portland type cement with a low C3A content or a slag cement with the addition of silica superfines in a proportion of at least 5% of the weight of the cement or again by a solidified waste.

3. A method according to claim 1, wherein the concrete used for the raft is reinforced by means of a metal lattice and/or by soldered sheets of plastic fibers having high tenacity, and wherein the concrete is cast in slabs of at least 15 meters by 15 meters in a diamond moulding, with inter-slab joints that are constituted by a chlorotrifluoroethylene-based polymer.

4. A method according to claim 1 wherein, before the placing of the wastes, a sheet of water-tight plastic material is deposited on the raft.

5. A method according to claim 4, wherein the sheet, which is a single-layer or a multilayer sheet, used for the cover of the concrete raft is constituted by a copolymer of ethylene and tetrafluoroethylene CTF2E.

6. A method according to claim 4, wherein a sheet of geotextile is interposed between the concrete and said sheet.

7. A method according to claim 1, wherein the travelling crane serving as a cover for the tumulus-shaped mound of wastes comprises a roll of film in its upper part and a roll inclined by 45° in each of the lateral walls, the horizontal and lateral sheets being soldered to each other when they are being unwound, by soldering equipment associated with said travelling crane.

8. A method according to claim 1, wherein said retention tank, which collects the rainwater flowing into said basin, is associated with analytical instruments enabling the measurement of parameters such as PH, heavy-metal content etc.

9. Installation for the storage of wastes by the implementation of the method according to claim 1, comprising, on a ground stabilized in depth: a concrete raft constituted by concrete slabs that have joints between them and are arranged in a diamond moulding; at least one tight-sealing material applied to the raft; a travelling crane assembly provided with wheels moving in a basin on the external periphery of the raft, the frame of said travelling crane comprising horizontal and inclined rolls of plastic film on the lateral walls, the wastes to be stored being placed on the raft in the form of a tumulus-shaped mound in a sliding formwork and beneath the progressive protection of the travelling crane; said basin being connected to a retention tank in which provision is made for measuring and analytical control instruments.

10. A method according to claim 2, wherein the concrete used for the raft is reinforced by means of a metal littice and/or by soldered sheets of plastic fibers having tenacity, and wherein the concrete is cast in slabs of a least 15 meters by 15 meters in a diamond moulding, with inter-salb joints that are constituted by a chlorotrifluoroethylene-based polymer.

11. A method according to claim 10 wherein, before the placing of the wastes, a sheet of water-tight plastic material is deposited on the raft.

12. A method according to claim 3 wherein, before the placing of the wastes, a sheet of water-tight plastic material is deposited on the raft.

13. A method according to claim 2 wherein, before the placing of the wastes, a sheet of water-tight plastic material is deposited on the raft.

14. A method according to claim 13, wherein the sheet, which is a single-layer or a multilayer sheet, used for the cover of the concrete raft is constituted by a copolymer of ethylene and tetrafluoroethylene CTF2E.

15. A method according to claim 12, wherein the sheet, which is a single-layer or a multilayer sheet, used for the cover of the concrete raft is constituted by a copolymer of ethylene and tetrafluoroethylene CTF2E.

16. A method according to claim 11, wherein the sheet, which is a single-layer or a multilayer sheet, used for the cover of the concrete raft is constituted by a copolymer of ethylene and tetrafluoroethylene CTF2E.

17. A method according of claim 5, wherein a sheet of geotextile is interposed between the concrete and said sheet.

18. A method according to claim 2, wherein the travelling crane serving as a cover for the tumulus-shaped mound of wastes comprises a roll of film in its upper part and a roll inclined by 45° in each of the lateral walls, the horizontal and lateral sheets being soldered to each other when they are being unwound, by soldering equipment associated with said travelling crane.

19. A method according to claim 3, wherein the travelling crane serving as a cover for the tumulus-shaped mound of wastes comprises a roll of film in its upper part and a roll inclined by 45° in each of the lateral walls, the horizontal and lateral sheets being soldered to each other when they are being unwound, by soldering equipment associated with said travelling crane.

20. A method according to claim 4, wherein the travelling crane serving as a cover for the tumulus-shaped mound of wastes comprises a roll of film in its upper part and a roll inclined by 45° in each of the lateral walls, the horizontal and lateral sheets being soldered to each other when they are being unwound, by soldering equipment associated with said travelling crane.

* * * * *